United States Patent
Schmidt et al.

(10) Patent No.: US 6,354,839 B1
(45) Date of Patent: Mar. 12, 2002

(54) REFRESHABLE BRAILLE DISPLAY SYSTEM

(75) Inventors: Robert N. Schmidt, Cleveland; Frederick J. Lisy, Euclid; Troy S. Prince, Cleveland; Greg S. Shaw, University Heights, all of OH (US)

(73) Assignee: Orbital Research, Inc., Cleveland, OH (US)

( * ) Notice: Subject to any disclaimer, the term of this patent is extended or adjusted under 35 U.S.C. 154(b) by 0 days.

(21) Appl. No.: 09/169,480

(22) Filed: Oct. 10, 1998

(51) Int. Cl.[7] ................................................ G09B 21/00
(52) U.S. Cl. ....................................... 434/113; 434/112
(58) Field of Search .................................. 434/112, 113, 434/114, 115, 117; 116/DIG. 17; 340/407.1, 407.2

(56) References Cited

U.S. PATENT DOCUMENTS

| | | | |
|---|---|---|---|
| 3,659,354 A | * 5/1972 | Sutherland | 434/113 |
| 4,586,903 A | * 5/1986 | Burchart | 434/114 |
| 4,836,784 A | * 6/1989 | Burchart | 434/113 |
| 4,985,692 A | * 1/1991 | Breider et al. | 434/113 X |
| 5,222,895 A | * 6/1993 | Fricke | 434/112 X |
| 5,286,199 A | * 2/1994 | Kipke | 434/114 |
| 5,366,050 A | * 11/1994 | Raynes | 434/113 X |
| 5,453,012 A | 9/1995 | Hudecek | |
| 5,496,174 A | * 3/1996 | Garner | 434/113 X |
| 5,580,251 A | * 12/1996 | Gilkes et al. | 434/113 |
| 5,685,721 A | 11/1997 | Decker | |
| 5,766,013 A | 6/1998 | Vuyk | |
| 5,842,867 A | * 12/1998 | Hong et al. | 434/114 |

* cited by examiner

Primary Examiner—Sam Rimell
(74) Attorney, Agent, or Firm—James A. Hudak

(57) ABSTRACT

A refreshable Braille display comprising a plurality of Braille dots that extend and retract arranged in Braille characters such that the Braille dots are operable as a personal computer monitor allowing a blind person to discern the information displayed thereon by reading the Braille characters formed by the extended Braille dots. At least one microelectromechanical device operably connects to the Braille dots such that the Braille dots retract and extend based upon the operation of the microelectromechanical device.

12 Claims, 6 Drawing Sheets

REFRESHABLE BRAILLE DISPLAY SYSTEM

This invention was made as a result of work under Grant 1R43/44EY11059 between the National Institutes of Health, National Eye Institute and Orbital Research Inc., Grant RA 94129004 between the U.S. Department of Education and Orbital Research Inc., and Grant DMI-9760377 between the National Science Foundation and Orbital Research Inc. and the U.S. Government has rights in this invention pursuant thereto.

BACKGROUND OF THE INVENTION

1. Field of the Invention

This invention relates, generally, to refresbable Braille display systems for use as monitors in computer systems and, more particularly, to refreshable Braille display systems using microelectromechanical (MEMS) actuators.

2. Description of the Related Art

The flourishing computer and information revolution has left behind visually impaired and particularly visually and hearing impaired individuals. This is due to the fact that visual display units, typically cathode ray tubes (CRTs), are the heart of all modern communication and information systems including the Internet. This especially affects those impaired individuals in the technical fields. To remedy this situation and promote the mandates of the Americans with Disabilities Act that mandates equal access and opportunities be presented to all capable individuals, Congress has proposed a State Model Bill. The bill would provide materials in a computer-accessible format capable of Braille reproduction. It states, "the Legislature finds that:

(1) the advent of the information age throughout the United States and around the world has resulted in lasting changes in information technology;

(2) use of interactive visual display terminals by state and state-assisted organizations is becoming a widespread means of access for employees and the public to obtain information available electronically, but nonvisual access, whether by speech, Braille, or other appropriate means has been overlooked in purchasing and deploying the latest information technology;

(3) presentation of electronic data solely in a visual format is a barrier to access by individuals who are blind or visually impaired, preventing them from participating on equal terms in crucial areas of life, such as education and employment;

(4) alternatives, including both software and hardware adaptations, have been created so that interactive control of computers and use of the information presented is possible by both visual and nonvisual means; and (5) the goals of the state in obtaining and deploying the most advanced forms of information technology properly include universal access so that segments of society with particular needs (including individuals unable to use visual displays) will not be left out of the information age."

Prior art computer interfaced Braille devices use various mechanisms to actuate the Braille dots and "refresh" the text. The dots are controlled via macroscopic actuators comprised of piezoelectric materials, shape memory alloys, and solenoids to raise individual pins in the Braille characters. Most of these devices display one or two lines and up to 80 Braille characters per row. Ideally, more rows of Braille text are desired, however, the complexity of the actuators and the close spacing of the Braille dots limit the number of Braille characters. Such actuators also require a very large "volume overhead" to accommodate this complex network of actuators and wires needed to operate the Braille dots. The result is that the foot print of the unit is much larger than the display surface and it is difficult to skin information based on the limited number of Braille characters.

Recently, a company in Cambridge Mass. called Braille Displays overcame the limitation of two rows of Braille cells. This company with the support of the National Science Foundation was able to produce a prototype 4 line by 40 column prototype refreshable Braille display. This 160 cell display is not commercially available. Telesensory produces an 80 character unit, PowerBraille 80 (PB80). This device has many user friendly features integrated into its device such as a cursor locator, a touch sensitive strip and scrolling toggle.

U.S. Pat. No. 5,685,721, to Decker, discloses a macro-sized shape-memory alloy based actuator enclosed in a series of tubes and housed in modules which are mounted into a multi-row display under ledges. U.S. Pat. No. 5,766,013, to Vuyk, discloses another macro-sized actuation technique utilizing an intrinsically conducting polymer sheet that expands when a charge is applied. Another macro-sized actuation technique, utilizing a rotary actuator with cams is disclosed by U.S. Pat. No. 5,453,012, to Hudecek. Also, Garner, U.S. Pat. No. 5,496,174 utilizes an electrorheological fluid that expands when a high voltage is applied. All of these devices suffer from the same fundamental problems: a large number of individual components needed for each Braille dot increasing assembly problems; high power requirements eliminating the potential for portability and creating problems dissipating the excess heat; responding fast enough to allow refresh rates appropriate for computer based communications; and, the difficulties in assembling the large number of Braille dots needed for true replication of computer display terminals.

Another approach to providing access to the visually impaired has been the development of optical recognition systems attached to voice synthesizers. Although these devices represent an enormous leap forward in access to both computerized and printed material, they are not appropriate for all tasks. Specifically, they cannot be used with detailed technical material which has a very specialized vocabulary. Medicine, law, accounting, engineering, and science careers are restricted by this limitation. Voice Synthesizing devices are not effective at dealing with tabular material. The voice synthesizing devices do not provide blind accountants and bookkeepers the access they require to spreadsheets and databases. Furthermore, voice synthesizers are not capable of limited document skimming, or provide a means to address accessing links otherwise known as sub-directories or complementary subject indicators. Perhaps most important, these reading devices provide limited ability to edit text or tables.

The devices currently available for the sight impaired are limited and have drawbacks in that they do not have fast enough refresh rate or sufficient Braille character ability to replicate a computer display, including memory capacity, readable area, and scanning and highlighting functions; are bulky and heavy; can not be adapted for different applications, i.e., a lap top vs. a desk top computer; and cannot "display" technical, accounting, spreadsheets, or other specialized forms of display which are not a basic textual document.

Accordingly, a need exists for a refreshable Braille display that overcomes the above mentioned limitations and drawbacks.

BRIEF SUMMARY OF THE INVENTION

The present invention provides a device to satisfy the aforementioned need.

One object of the present invention is to provide a Braille display system which has a rapid refresh rate of the Braille dots.

Another object of the present invention is to provide a refreshable Braille display system that has the ability to conveniently present text, spreadsheet and database information, technical material and information in tabular or columnar format to visually impaired persons.

Still another object of the present invention is to provide a refreshable Braille display that allows a user to access links or subdirectories without removing their hands from the display surface.

Still another object of the present invention is to provide a modular Braille display system that is flexible so that it can be sized and arranged to fit a user's needs.

Still another object of the present invention is to provide a Braille display system which is modular and therefore, quickly and easily assembled or repaired.

Still another object of the present invention is to provide a Braille display system which can present text and limited graphics, normally displayed on a computer display terminal or CRT, to a visually impaired person.

Still another object of the present invention is to provide a Braille display system that has a tactile surface with no holes, gaps or voids, and provides a continuous uninterrupted tactile reading surface for the user eliminating any interference with reading of Braille characters and preventing environmental damage to the underlying Braille display hardware.

Accordingly, the present invention relates to a refreshable Braille display; comprising a plurality of Braille dots that extend and retract, arranged in Braille characters such that the Braille dots are operable as a personal computer monitor to allow a blind person to discern the information displayed thereon by reading the Braille characters. At least one microelectromechanical device operably connects to the Braille dots such that the Braille dots retract and extend based upon the operation of the microelectromechanical device. The Braille character comprises six or eight Braille dots. Multiple Braille characters are arranged in functionally independent modules of rows and columns. The microelectromechanical device operates electrostatically or comprises shape memory alloy material. The microelectromechanical device will either directly move a pin or directly form the individual Braille dots, or it will pneumatically move a pin or directly form a Braille dot.

In another aspect, the present invention relates to a refreshable Braille display; comprising a housing; a plurality of Braille dots arranged in Braille characters mounted in the housing; at least one microelectromechanical device operably attached to each Braille dot; a compressor which provides air pressure to the microelectromechanical devices; a microcontroller mounted in the housing and programmed to directly control the operation of the microelectromechanical devices to extend and retract the Braille dots; a personal computer programmed with Braille translation software and connected to the microcontroller. The information and data from the personal computer is translated and transferred to the microcontroller. The microcontroller operates the microelectromechanical device in response thereto which extends and retracts the Braille dots allowing a blind person to discern the information displayed thereon by reading the Braille characters formed by the extended Braille dots.

In yet another aspect, the present invention relates to a refreshable Braille display system, comprising a housing; at least one module mounted in the housing, and a top surface sealed to the housing and the modules. The top surface is an elastomeric material and is selectively deformable. At least one microelectromechanical device is mounted in the module such that the microelectromechanical device selectively deforms the top surface by forming dimples therein. The dimples function as Braille dots and form Braille characters. The microelectromechanical device selectively flattens the dimple thereby removing the Braille dot and thereby changing or removing the Braille character. The Braille dots and the Braille characters form a Braille display. A module microcontroller controls the microelectromechanical device. A microcontroller coordinates each individual module microcontroller and communicates with the computer. A personal computer programmed with Braille translation software connects to the microcontroller such that information and data from the personal computer is translated and transferred to the microcontroller. The microcontroller or the module microcontrollers operate the microelectromechanical devices in response thereto which forms the Braille dots allowing a blind person to discern the information displayed thereon by reading the Braille characters formed by the Braille dots.

BRIEF DESCRIPTION OF THE SEVERAL VIEWS OF THE DRAWINGS

Further features of the present invention will become apparent to those skilled in the art to which the present invention relates from reading the following specification with reference to the accompanying drawings in which.

DETAILED DESCRIPTION OF THE INVENTION

Figure 1:
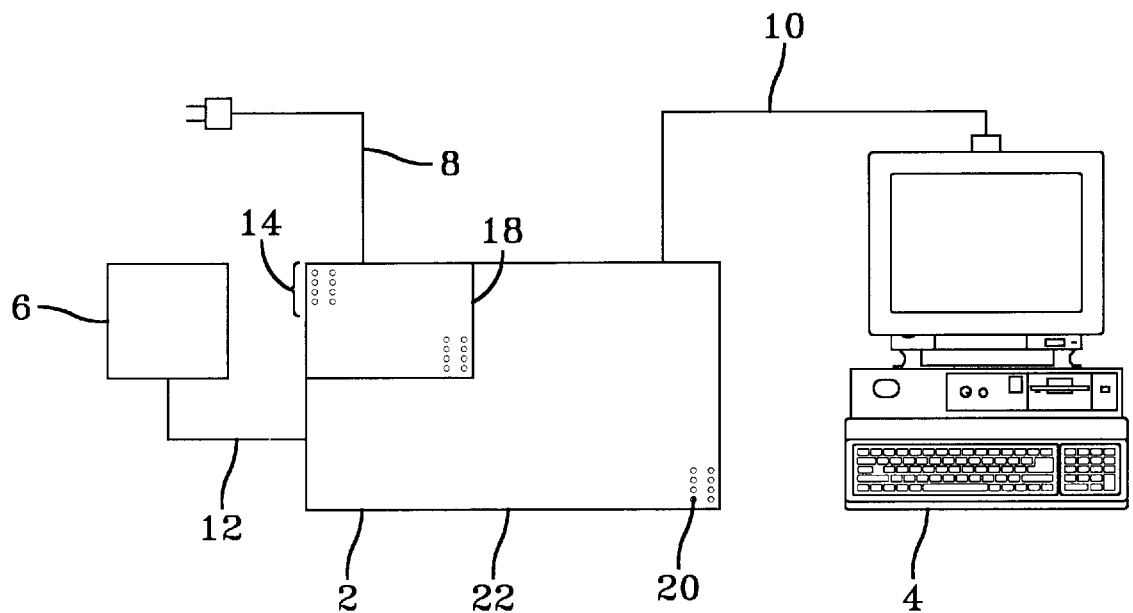
FIG. 1 is a view of the present invention.

Referring now to the drawings and, more particularly, to FIG. 1 there is shown a view of the present invention. A Braille display 2 comprises Braille dots 20 arranged into Braille characters 14. Although, each Braille character 14 requires only six Braille dots 20, the Braille character 14 of the present invention is preferably comprised of eight Braille dots 20. The two extra Braille dots 20, (by convention referred to as Braille dots 7 and 8) are used to highlight text within a document such as hyperlinks, boldface or italicized text. The Braille characters 14 are arranged in modules 18. In this embodiment of the present invention, the Braille characters in each module are arranged in two rows and twelve columns (FIG. 2), although other configurations could be used. For pneumatic actuation, a compressor 6 provides pneumatic pressure to the Braille display 2 through tubing 12. The Braille display 2 receives electrical power through power cable 8 which can plug into a standard 120 or 220 volt receptacle or batteries that may be mounted separately or within the Braille display 2. A data cable 10 connects a personal computer 4 to the Braille display 10.

Figure 2:
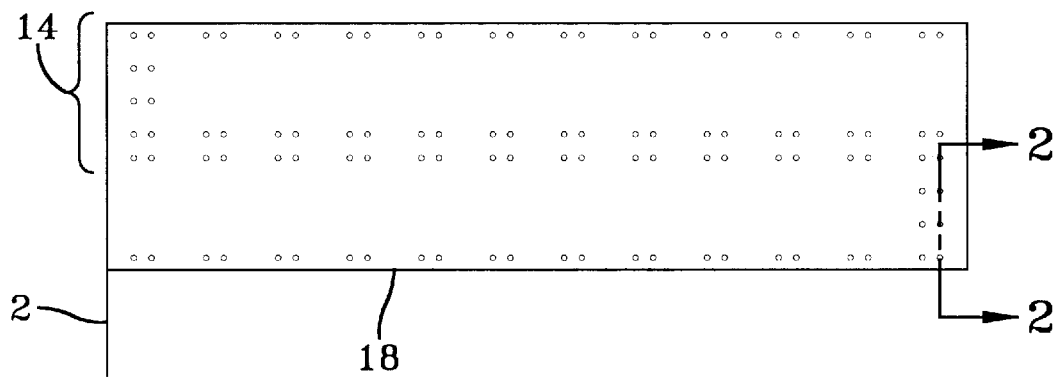
FIG. 2 is a layout of the module showing Braille characters.

Referring now to FIG. 2 there is shown a layout of a module 18 with the Braille characters 14 arranged in two rows and twelve columns. The present invention is not limited by any particular layout of the modules 18. Since in this particular embodiment of the present invention, each Braille character comprises eight Braille dots 20, each module 18 will have 2×12×8=192 Braille dots 20. Also, in this particular embodiment (10 rows, 84 characters wide) there are 35 modules 18 on the Braille display 10 arranged in 5 rows and seven columns for a total number of 6720 Braille dots 20 on the Braille display 22. This modular design allows the production of various sized Braille displays 2 based upon the number of modules 18 used. The modular design allows for longer row (e.g. 10 rows, 84 characters wide) Braille displays to display spreadsheets and other tabular data, or longer and narrower (e.g. 20 rows, 44 characters wide) for reading text, or single module (2 rows, 12 characters wide) Braille displays for use with a portable computer, ATM machines, or other embedded or portable devices.

Figure 3:
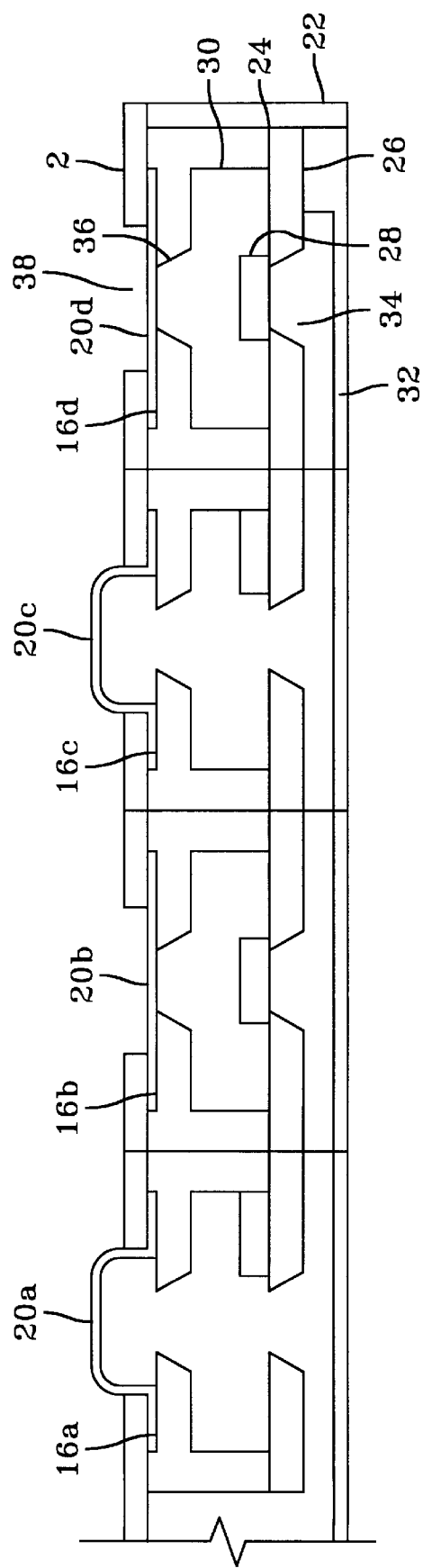
FIG. 3 is a view of the section cut along lines 2—2 on FIG. 2.

Referring now to FIG. 3 there is shown a view of the section cut along lines 2—2 on FIG. 2. The Braille display 2 is enclosed in a housing 22. FIG. 3 shows four Braille dots 20a, b, c, d, one-half of a Braille character 14 inside of the module 18. The Braille dots 20 are shown alternately extended and retracted, 20a and 20c extended, 20b and 20d retracted. Each Braille dot 20 is operably attached to a microelectromechanical (MEMS) device 16a, b, c, d, respectively, this actuation can be either direct or indirect utilizing a pneumatic or hydraulic force. In this embodiment, the Braille dot 20 is attached and operates using pneumatic force. Additionally, the Braille dot 20 does not have to be a distinct, separate element but can also be a portion of the top surface 46 (see FIGS. 5A and 5B). The MEMS device 16 is comprised of a base 26 and frame 24. The base 26 has a base aperture 34 which provides a passage from the plenum 32 to the chamber 30. The frame 24 has a port 36 opening from the chamber 30. Actuator 28 (for illustrations purposes shown as a sliding element or boss in FIG. 3) operates to open and close the MEMS device 16. The Braille dot 20 is made from a flexible, resilient polymer and is secured to the inside of the housing 22 juxtaposed between the port 36 and an opening 38 in the housing 22. When the actuator 28 operates to open the MEMS device 16 air in the plenum 32 flows into and pressurizes the chamber 30. The pressure is exerted on the Braille dot 20 through port 36. The pressure on the Braille dot 20 forces the Braille dot 20 to expand through the opening 38 (20a and 20c). When the actuator 28 operates to close the MEMS device 16, it closes the base aperture 34 and pressure is removed from the chamber 30 and vents therefrom. With the pressure venting, the Braille dot 20 contracts, retracting back through the opening 38 (20b and 20d) Venting can be accomplished by leak holes in the Braille dots 20, or by vents from the chambers 30. The second valve position in a three way valve is a vent that will allow faster refresh rates. The actuator 28 can be operated electrostatically, piezoelectrically or using shape-memory alloys.

Figures 4, 6:
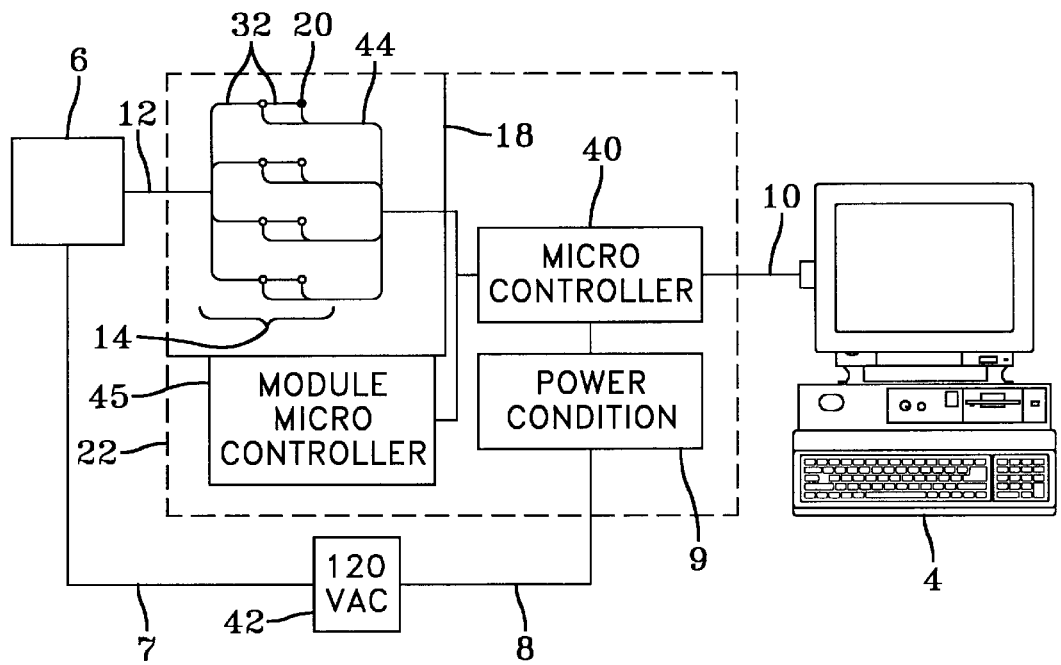
FIG. 4 is a block diagram of the control function of a single module of the present invention.

Referring now to FIG. 4 there is shown a block diagram of the control function of the present invention. Data cable 10 connects between a personal computer 4 and the microcontroller 40 mounted in the housing 22. Braille translation software is programmed into the personal computer 4 to translate display information into commands for the Braille display system. Both commercially available Braille Translation software, such as Duxbury or MicroDots, or custom programmed software may be used with the Braille device. The data cable 10 transfers data and information, translated and otherwise conditioned by the software, from the computer to the microcontroller 40. The microcontroller 40 contains firmware and memory capacity, including nonvolatile memory, which is programmed to actuate the appropriate Braille dots 20 in response to the data and information from the personal computer 4. The Braille display system can take two different configurations, one configuration utilizes a single microcontroller 40 which control the Braille dots by sending appropriate signals through leads 44 (also shown in FIG. 4), and a second configuration that utilizes a microcontroller 40 to coordinate the operation of individual module microcontrollers 45 which then control the Braille dots in the respective module by sending appropriate signals through leads 44. Each individual module 18 has individual connectors and wiring to connect each module 18 with either the neighboring modules 18 or the microcontroller 40 for signal, power, and, depending on actuation technique, a pneumatic supply line 12. The modules 18 are mechanically attached to a housing 22 that will hold each individual module 18 and the supporting hardware: power conditioning 9; potentially a compressor 6; and, a coordinating microcontroller 40 which will control the individual modules 18 and communicate with the computer 4. The use of module microcontrollers simplifies the overall control system, reduces the total computational power needed in a single processor, and allows the Braille dots to be operated at a rapid refresh rate. The refresh rate is the amount of time it takes for a Braille dot 20 to extend and retract. A high refresh rate is important for many computer based applications where rapid scrolling and moving through information is needed, such as a spreadsheet or other tabular data.

For the pneumatically actuated Braille display systems, compressor 6 provides pneumatic pressure to each Braille dot 20 through tubing 12 and which provides pneumatic pressure to the plenums 32. The compressor 6 can be any appropriate air pump but in the present invention a Medo linear compressor, AC0102, is used. In designs where the MEMS device 16 directly actuates the Braille dot 20, no pneumatic force is needed and therefore, neither is a compressor 6. Power is provided from a power source 42, to the compressor 6 and the microcontroller 40 by power cables 7 and 8, respectively. The power can be conditioned by power conditioning means 9 before connection to the microcontroller 40. In another embodiment, the compressor 6 can be located inside of the housing 22 and one power cable can be used for both the compressor 6 and the microcontroller 40 with power provided from either the power conditioning means 9 or directly from 120 VAC 42. The power conditioning means 9 can convert and condition either AC or DC power coming from batteries, standard wall receptacles, or other electrical power source.

Figure 5A:
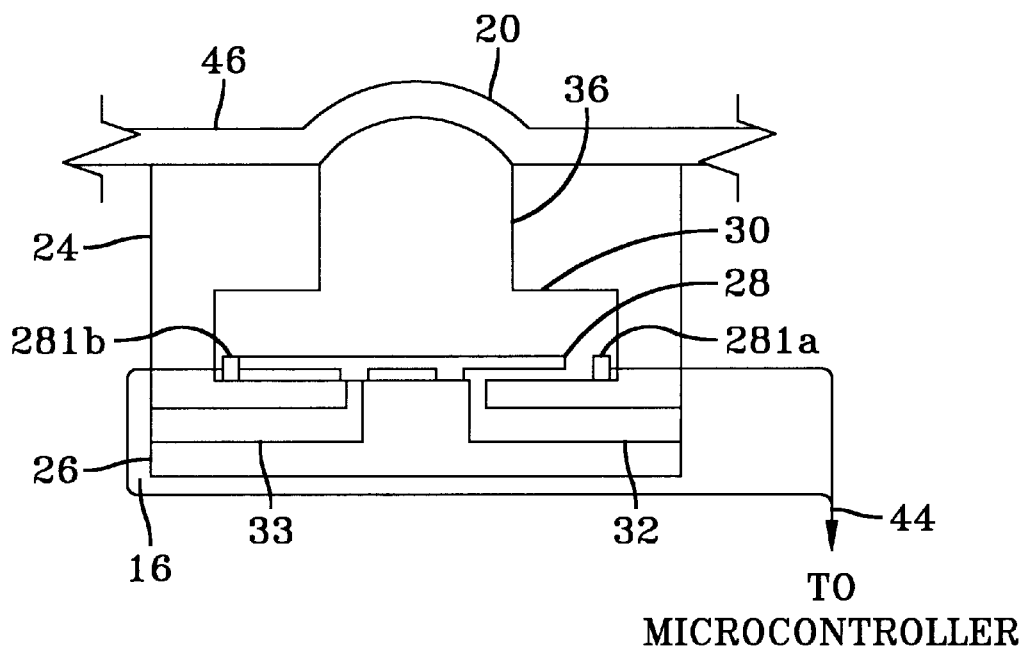
FIGS. 5A and 5B are detail views of a MEMS device and Braille dot extended and retracted, respectively FIG. 6 a schematic representation of the Braille dots actuation scheme.
Figure 5B:
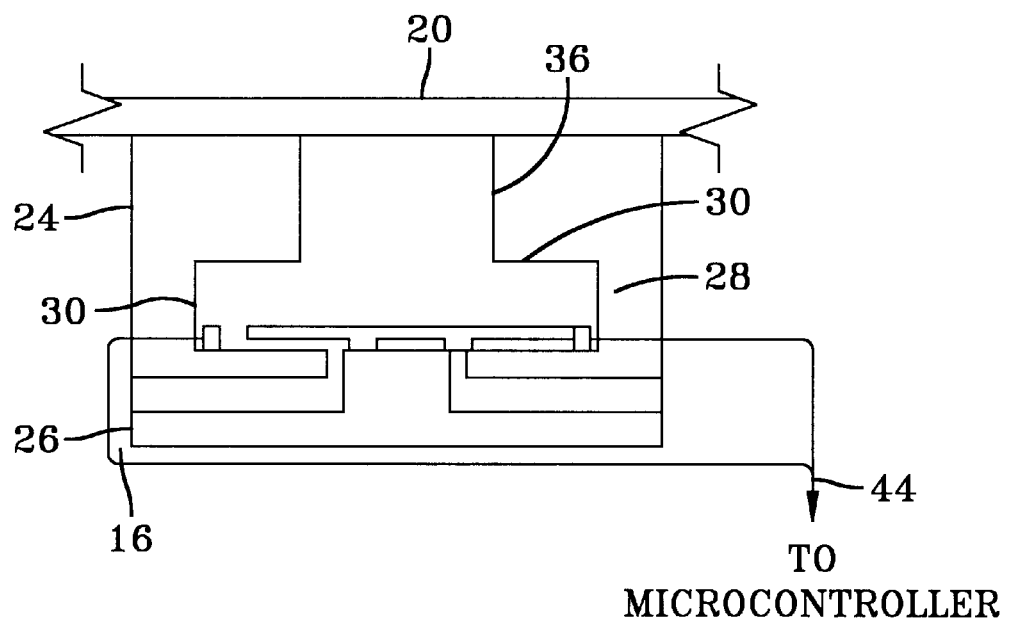

Referring now to FIG. 5A and 5B there are shown a detail views of a Braille dot 20 with a MEMS device 16 extended and retracted, respectively. The actuator 28 is a sliding element operating between two electrodes, 281a and 281b depending on to which electrode voltage is applied. In FIG. 5A voltage is being applied to electrode 281b and the slide element 28 is attracted to it, opening a passage to plenum 32 and closing the passage to the vent 33. In this position air flows into the chamber 30 and the chamber 30 is allowed to pressurize and expand the Braille dot 20. In this the Braille dot 20 is formed by distorting the top surface 46 attached to the frame 24 (which may be part of the housing 22 module 18 and is not shown in FIG. 5A or 5B). The Braille dot 20, is just a dimple in the top surface 46. Referring now to FIG. 5B, voltage is applied to electrode 281a and the slide element 28 is attracted to it closing the passage to the plenum 32 and opening the passage to the vent 33 and allowing the pressure to vent out of the chamber 30. Without the pressure, the Braille dot 20 contracts, flattening out the Braille dot in the top surface 46. The voltage to the electrodes 281a, 281b is controlled by either the microcontroller 40 through lines 44 or the module microcontroller 45 through lines 44 allowing independent extension and retraction of the Braille dots 20.

Referring now to FIG. 6 there is shown a schematic representation of the Braille dots 20 electronic addressing scheme. The Braille dots 20 are actuated based upon a row and column scanning mechanism. Although, only 4 rows and 5 columns are shown on FIG. 6, the scanning mechanism can be applied to any number of rows and columns. If at any time "t" both the row and column are at open electrode voltage (signified by "0") the MEMS device is open and the Braille dot 20 is extended. If either the row or the column is at close electrode voltage (signified by "1"), the MEMS device 16 is closed and the Braille dot 20 is retracted. In this manner, at any time "t" a specific Braille dot 20 based upon its row and column location can be operated. For example, at $t_1$ row 1 has open electrode voltage and column 1 has open electrode voltage. The Braille dot 20 is extended as shown by the X on the actuation scheme.

Figure 7:
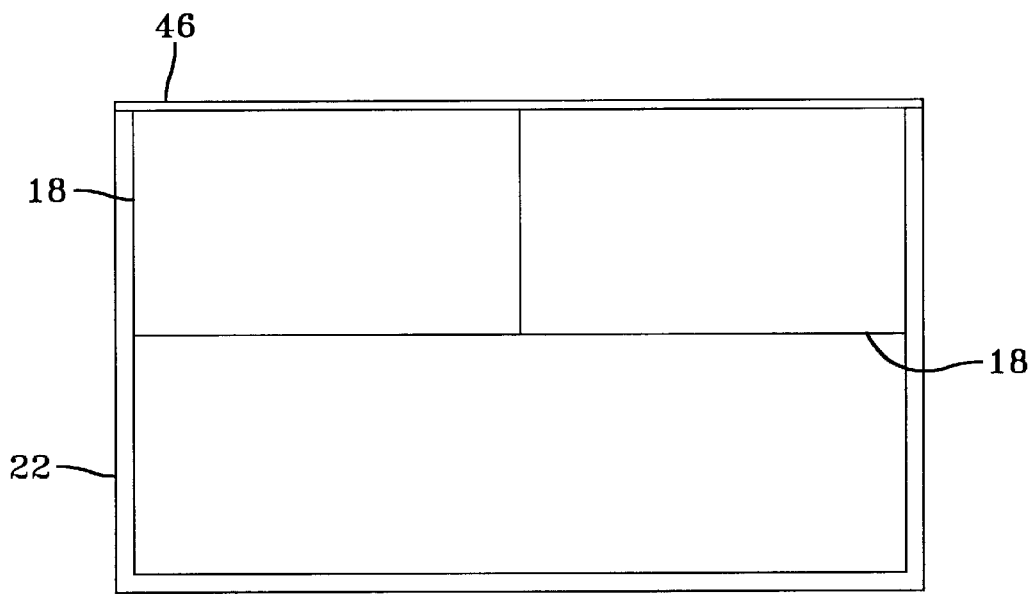
FIG. 7 is another design for the MEMS device utilizing an actuator based upon a sliding element.

Referring now to FIG. 7, there is shown an internal elevation of the housing 22. In this FIG. 7, the modules 18 are mounted to the inside of the housing 22 near its top. The top surface 46 attaches to the top of the housing 22. The top surface 46 is constructed of a single sheet of polymer material stretched over the top of the housing 22. The top surface 46 presents a continuous surface which provides both environmental protection to the MEMS devices 16 (not shown in FIG. 7) and other electronic hardware as well as providing a tactile surface with no discrete holes, seams, gaps or voids. In the present invention a low modulus elastomer with a thickness of approximately 0.004" is used for the top surface 46. Two commercially available elastomer films can be used; a medium modulus latex polymer mix, or a blend of Natural Rubber, Neoprene and Nitrile. The top surface 46 is sealed to the modules 18 and/or housing 22 using either a suitable epoxy or adhesive or a vacuum seal. This provides a continuous uninterrupted tactile reading surface for the user eliminating any interference with reading of Braille characters 14. This modular design allows different size Braille displays 2 to be assembled from a different number of individual modules 18.

Figure 8A:
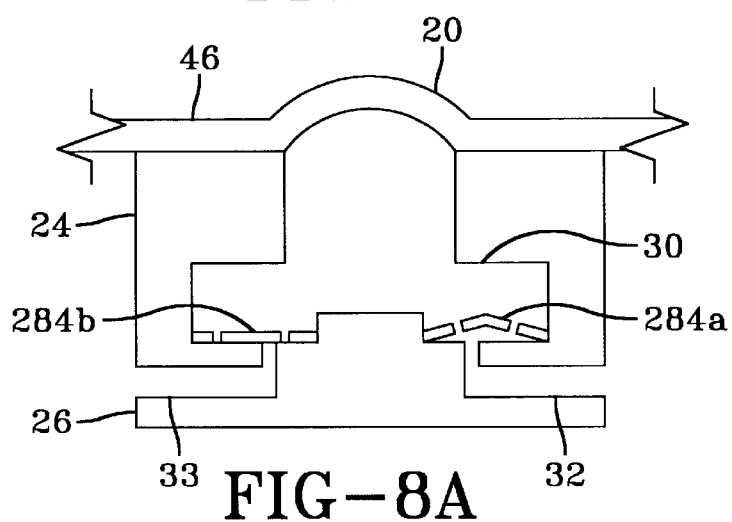
FIGS. 8A, and 8B are details of a MEMS devices that directly actuates a Braille dot using a thin film SMA element.
Figure 8B:
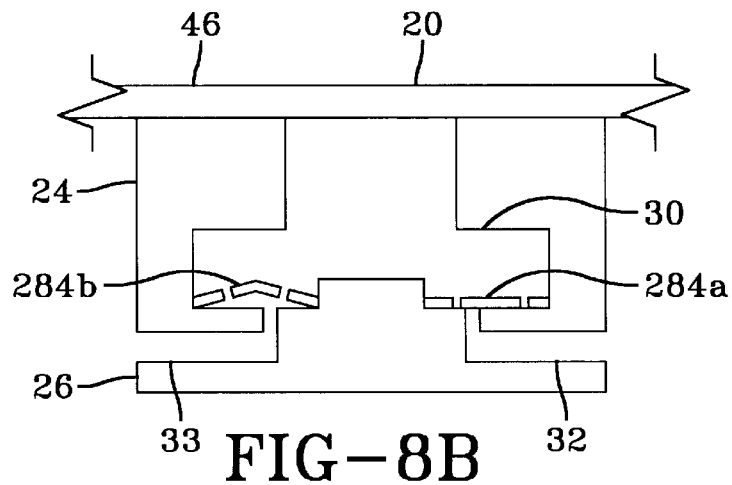

Referring now to FIGS. 8A and 8B there are shown detail views of a Braille dot 20 with a MEMS device 16 extended and retracted, respectively. The actuators are a pair of MEMS microvalves 284a, 284b which open or close. The MEMS microvalves 284a, 284b can be actuated electrostatically, piezoelectrically or using thin film shape-memory alloys. In FIG. 8A, the MEMS microvalve 284a is open allowing pressurized air from the plenum 32 into the chamber 30, while the MEMS microvalve 284b is closed blocking the pressurized air from leaving the chamber 30. The pressurized air in the chamber 30 expands the Braille dot 20. In this the Braille dot 20 is formed by distorting the surface covering 45 attached to the frame 24 (which may be part of the housing 22 module 18 and is not shown in FIG. 8A or 8B). The Braille dot 20, is just a dimple in the top surface 46. Referring now to FIG. 8B, the MEMS microvalve 284a is now closed blocking the flow of pressurized air from the plenum 32 and the MEMS microvalve 284b is now opened allowing the air to evacuate from the chamber 30 to the vent 33. With the pressure vented, the Braille dot 20 contracts, flattening out the dimple on the top surface 46. The voltage to the two the MEMS microvalves 284a, 284b are controlled either directly by the microcontroller 40 or by the module microcontroller 45 to extend and retract Braille dots 20 independent of other Braille dots 20.

Figure 9A:
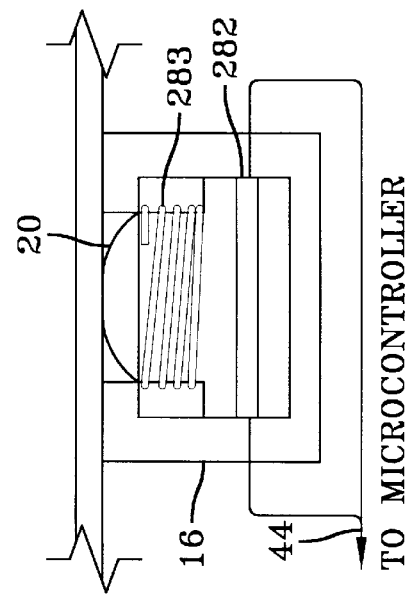
FIGS. 9A, and 9B are details of a MEMS device that directly forms the Braille dot using a thin film SMA element.
Figure 9B:
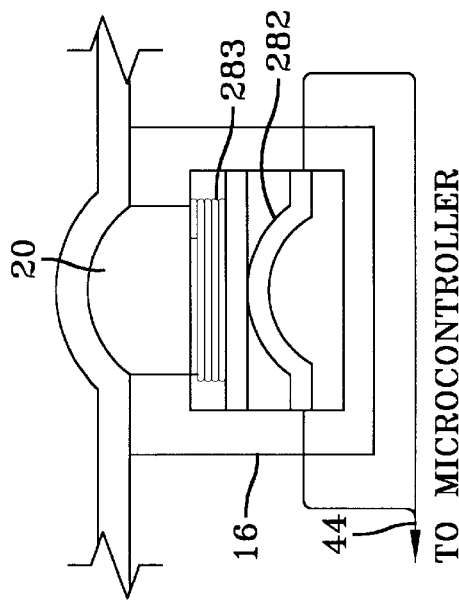

Referring now to FIGS. 9A and 9B there is shown a detail view of a Braille dot 20 and MEMS device 16 which uses a thin film shape memory alloy ("SMA") element 282 as the actuator. A thin film SMA based microelectromechanical actuator is significantly different then traditional bulk shape memory alloy actuators in size, fabrication techniques, and operation. The mechanical properties of a thin film SMA can be precisely tailored by changing the alloy ratios during fabrication while a macro sized bulk SMA actuator may have regions where the alloy ratio changes within the bulk material of the actuator, these regions will increase power consumption, reduce fatigue resistance and limit life. Thin film SMA actuators have greater fatigue life and improved phase transition characteristics then traditional bulk SMA actuators. The thin film SMA also has faster response and lower power consumption then traditional bulk SMA actuators due to their reduced volume and large surface area which allows the actuator to change from one phase state to another faster then the larger bulk SMA actuators. The rapid response of the thin-film SMA actuators allows a user to quickly scroll through a document without having the refreshable Braille display lag behind. The lower power consumption of a thin film SMA actuator reduces the amount of heat that needs to be dissipated from the actuators during operation and can permit battery operation for use with portable electronic devices.

FIGS. 9A and 9B also show the application of a direct actuation of the Braille dot 20 without the need of a pneumatic force. Shape Memory Alloys (SMA's) are a unique class of alloys which have the ability to form two different crystalline phases, defined as martensite and austenite, in response to temperature and strain. SMA's are produced by equiatomically combining at least two component metals into a desired shape which is then annealed. When produced, the SMA is in the austenite phase, having a certain shape and characterized by low ductility, high Young's modulus and high yield stress. Upon cooling the SMA changes to the martensite phase characterized by high ductility, a low Young's modulus and low yield stress. In the martensite phase, the SMA is easily deformed and can take on a different shape from its austenite or original shape by applying an external strain. The SMA will retain this different shape until it is heated to its austenitic transformation temperature. When the SMA is heated to its austenitic transformation temperature the SMA transitions to its austenite phase and transforms back to its original shape.

In FIG. 9A the thin film SMA element 282 is in its martensite phase with the Braille dot 20 retracted. Since the martensite phase is characterized by high ductility, low Young's modulus and low yield stress, the thin film SMA element 282 is easily deformed by external stresses like biasing means 283, shown as a spring in FIG. 9. When heated to its austenitic transfer temperature, the thin film SMA element 282 transitions from its martensite phase to its austenite phase transforming to its austenitic or original shape. The force produced by the biasing means 283 is less than the force produced by the thin film SMA element 282 during this transformation. The thin film SMA element 282, thereby, overcomes that force during this transformation, and, in so doing, extends the Braille dot 20 as shown in FIG. 9B. The thin film SMA element 282 is heated by joule heating using electric current from an electric power source controlled by the microcontroller 40 (not shown in FIGS. 9A or 9B). Because the austenite phase is characterized by low ductility, high Young's modulus and high yield stress, the thin film SMA element 282 remains in its austenitic or original shape and the Braille dot 20 remains extended. When the electric current is removed, the thin film SMA element 282 cools to its martensitic transfer temperature at which point it transitions to the martensite phase and the external stress from the biasing means 283 deforms the thin film SMA element 282, retracting the Braille dot 20. Alternately, the thin film SMA element 282 can be operably connected to the Braille dot 20 to retract it when transitioning from its martensite phase to its austenite phase. The Braille dot 20, then, will be extended by the biasing means 283, when the thin film SMA element 282 transitions from the austenite phase to the martensite phase. The Braille dot 20 is extended and retracted based upon the crystalline phase of the thin film SMA element 282. Instead of a spring as shown, the biasing means 283 can be any mechanism including a second thin film SMA element, a diaphragm or manipulated boss.

Figure 10A:
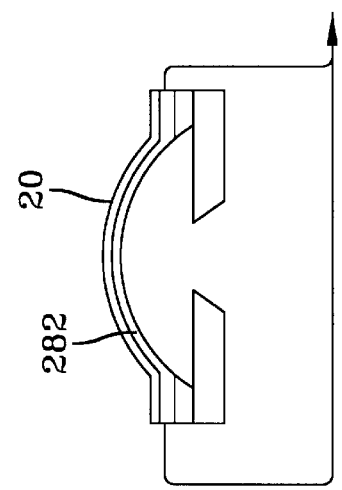
FIGS. 10A, and 10B are details of a MEMS device that directly forms the Braille dot using a thin film SMA element.
Figure 10B:
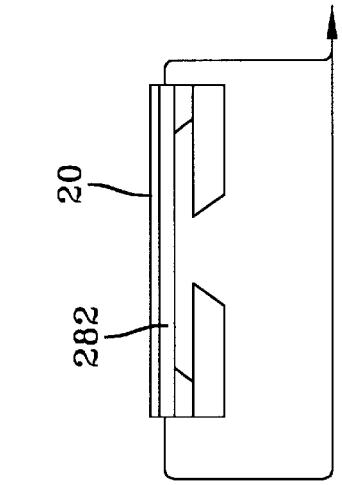

In FIG. 10A and FIG. 10B, the thin film SMA element is shown directly forming the Braille dot itself 282. The Braille dot may be covered with a polymer cover 20 which can provide a biasing force to flatten the Braille dot. The biasing force may be provided by either a pressure or a vacuum applied through the orifice located directly under the SMA film 282.

Similarly direct actuation of the Braille dot 20 can be accomplished with a MEMS device 16 utilizing other mechanisms not based on shape memory alloy like springs, diaphragms and bosses. It is only necessary to have opposite biasing forces operably attached to the Braille dot 20 in a manner such that the Braille dot 20 can be extended and retracted in response to signals from the microcontroller 40 or module microcontrollers 45.

While the preferred embodiments of the invention have been shown and described, it will be apparent to those skilled in this art that various modifications may be made in these embodiments without departing from the teachings of the present invention.

What is claimed is:

1. A refreshable Braille display comprising:
   a. a plurality of Braille dots that extend and retract arranged in Braille characters forming a Braille display such that said Braille dots are operable as a personal computer monitor on which information is displayed allowing a blind person to discern said information displayed thereon by reading said Braille characters formed by the extended Braille dots; and
   b. a microelectromechanical device operably connected to each of said Braille dots such that said Braille dots retract and extend based upon the operation of said microelectromechanical device, said microelectromechanical device being operated electrostatically.

2. A refreshable Braille display for use with a personal computer, ATM machine and other embedded and portable devices having Braille translation software programmed therein comprising:
   a. a housing;
   b. a plurality of Braille dots arranged in Braille characters movably mounted in said housing and forming a Braille display;
   c. a micoelectromechanical device operably attached to each of said Braille dots;
   d. a microcontroller mounted in said housing and programmed to control the operation of said microelectromechanical device connected to said personal computer, ATM machine and other embedded and portable devices, such that information and data from said personal computer, ATM machine and other embedded and portable devices are translated and transferred to said microcontroller whereby said microcontroller operates said microelectromechanical device in response thereto such that said Braille dots extend and retract based upon the operation of said microelectromechanical device allowing a blind person to discern the information displayed thereon by reading by said Braille characters formed by the extended Braille dots; and
   e. a compressor that provides air pressure to said microelectromechanical device whereby said mircoelectromechanical device is pressurized when it is opened and depressurized when it is closed thereby extending and retracting said Braille dot.

3. The refreshable Braille display of claim 2 further comprising a leak hole in said Braille dots such that said air pressure vents through said leak hole from said microelectromechanical device when it is closed.

4. The refreshable Braille display of claim 2 further comprising a vent in said microelectromechanical device such that said air pressure vents through said vent from said microelectromechanical device when it is closed.

5. The refreshable Braille display of claim 2 wherein said air pressure discharges to said compressor from said microelectromechanical device when it is closed.

6. A refreshable Braille display for use with a personal computer, ATM machine and other embedded and portable devices having Braille translation software programmed therein comprising:
   a. a housing;
   b. a plurality of Braille dots arranged in Braille characters movably mounted in said housing and forming a Braille display;
   c. a microelectromechanical device operably attached to each of said Braille dots, said microelectromechanical device being operated electrostatically; and
   d. a microcontroller mounted in said housing and programmed to control the operation of said microelectromechanical device connected to said personal computer, ATM machine and other embedded and portable devices, such that information and data from said personal computer, ATM machine and other embedded and portable devices are translated and transferred to said microcontroller whereby said microcontroller operates said microelectromechanical device in response thereto such that said Braille dots extend and retract based upon the operation of microelectromechanical device allowing a blind person to discern the information displayed thereon by reading said Braille characters formed by the extended Braille dots.

7. A refreshable Braille display having a certain size and arrangement for use with a personal computer, ATM machine and other embedded and portable devices having Braille translation software programmed therein comprising:

a. a housing;

b. at least one module mounted in said housing;

c. a top surface sealed to said housing and said at least one module, said top surface being a selectively deformable elastomeric material;

d. a microelectromechanical device mounted in said module such that said microelectromechanical device selectively deforms said top surface by forming dimples therein which said dimples function as Braille dots which form Braille characters, and said microelectromechanical device allows said dimples to selectively flatten thereby removing said Braille dots and thereby changing said Braille characters, said Braille dots and said Braille characters forming a Braille display;

e. a microcontroller, which controls said microelectromechanical device, connected to said personal computer, ATM machine and other embedded and portable devices such that information and data from said personal computer, ATM machine and other embedded and portable devices are translated and transferred to said microcontroller whereby said microcontroller operates said microelectromechanical device in response thereto which forms said Braille dots allowing a blind person to discern the information displayed thereon by reading said Braille characters formed by the extended Braille dots; and f. a compressor that provides air pressure to said microelectromechanical device whereby said microelectromechanical device forms said Braille dot by air pressure.

8. The refreshable Braille display of claim 7 further comprising a leak hole in said Braille dots such that said air pressure vents through said leak hole from said microelectromechanical device when it is closed.

9. The refreshable Braille display of claim 7 further comprising a vent in said microelectromechanical device such that said air pressure vents through said vent from said microelectromechanical device when it is closed.

10. The refreshable Braille display of claim 7 wherein said air pressure discharges to said compressor from said microelectromechanical device when it is closed.

11. A refreshable Braille display comprising:

a. a Braille dot that extends and retracts; and b. a microelectromechanical device operably connected to said Braille dot such that said Braille dot extends and retracts based upon the operation of said microelectromechanical device, said microelectromechanical device extending said Braille dot by allowing pressure to be applied thereto, said Braille dot being made from a flexible, resilient polymer such that said Braille dot retracts by contracting when said pressure is not applied by said microelectromechanical device, said pressure being air pressure that vents when said Braille dot retracts by contracting.

12. The refreshable Braille display of claim 11 further comprising a leak hole in said Braille dot such that said air pressure vents through said leak hole when said Braille dot retracts by contracting.

* * * * *